United States Patent
Furubayashi et al.

(10) Patent No.: US 6,976,091 B2
(45) Date of Patent: Dec. 13, 2005

(54) GATEWAY SYSTEM

(75) Inventors: Masashi Furubayashi, Kawasaki (JP); Shun'ichi Harada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 735 days.

(21) Appl. No.: 09/946,452

(22) Filed: Sep. 6, 2001

(65) Prior Publication Data
US 2002/0194381 A1 Dec. 19, 2002

(30) Foreign Application Priority Data
Jun. 19, 2001 (JP) .............................. 2001-184229

(51) Int. Cl.[7] .............................................. G06F 15/16
(52) U.S. Cl. ...................................... 709/246; 709/232
(58) Field of Search .............................. 709/230, 246, 709/232

(56) References Cited

U.S. PATENT DOCUMENTS

| | | | | |
|---|---|---|---|---|
| 5,075,850 A | * | 12/1991 | Asahioka et al. | 704/2 |
| 5,884,246 A | * | 3/1999 | Boucher et al. | 704/2 |
| 5,974,371 A | * | 10/1999 | Hirai et al. | 704/2 |
| 6,003,049 A | * | 12/1999 | Chiang | 715/535 |
| 6,263,445 B1 | * | 7/2001 | Blumenau | 713/201 |
| 6,421,429 B1 | * | 7/2002 | Merritt et al. | 379/93.17 |
| 6,502,064 B1 | * | 12/2002 | Miyahira et al. | 704/7 |
| 6,636,970 B2 | * | 10/2003 | Akiyama et al. | 713/189 |
| 6,738,827 B1 | * | 5/2004 | Abir | 709/245 |
| 2002/0007383 A1 | * | 1/2002 | Yoden et al. | 707/536 |
| 2002/0111788 A1 | * | 8/2002 | Kimpara | 704/2 |
| 2002/0178370 A1 | * | 11/2002 | Gurevich et al. | 713/189 |

\* cited by examiner

*Primary Examiner*—Zarni Maung
*Assistant Examiner*—Nghi Tran
(74) *Attorney, Agent, or Firm*—Mattingly, Stanger, Malur & Brundidge, P.C.

(57) ABSTRACT

A gateway system comprises a character code conversion table, a data code conversion table, a data format conversion table, and a transmitter/receiver combination table. Concerning data exchange among a plurality of information systems, which are connected in the same network as that connected to this gateway system, the gateway system has a function of checking whether or not combination of a transmitter and a receiver is appropriate by referring to the transmitter/receiver combination table, and a function of performing data format conversion, data code conversion, and character code conversion corresponding to the combination of the transmitter and the receiver by referring to the related tables. In addition, each of the information system is connected to the gateway system via the network, and has a transmitter/receiver combination table and a function of checking validity of transmitter/receiver combination included in received data by referring to this table.

7 Claims, 6 Drawing Sheets

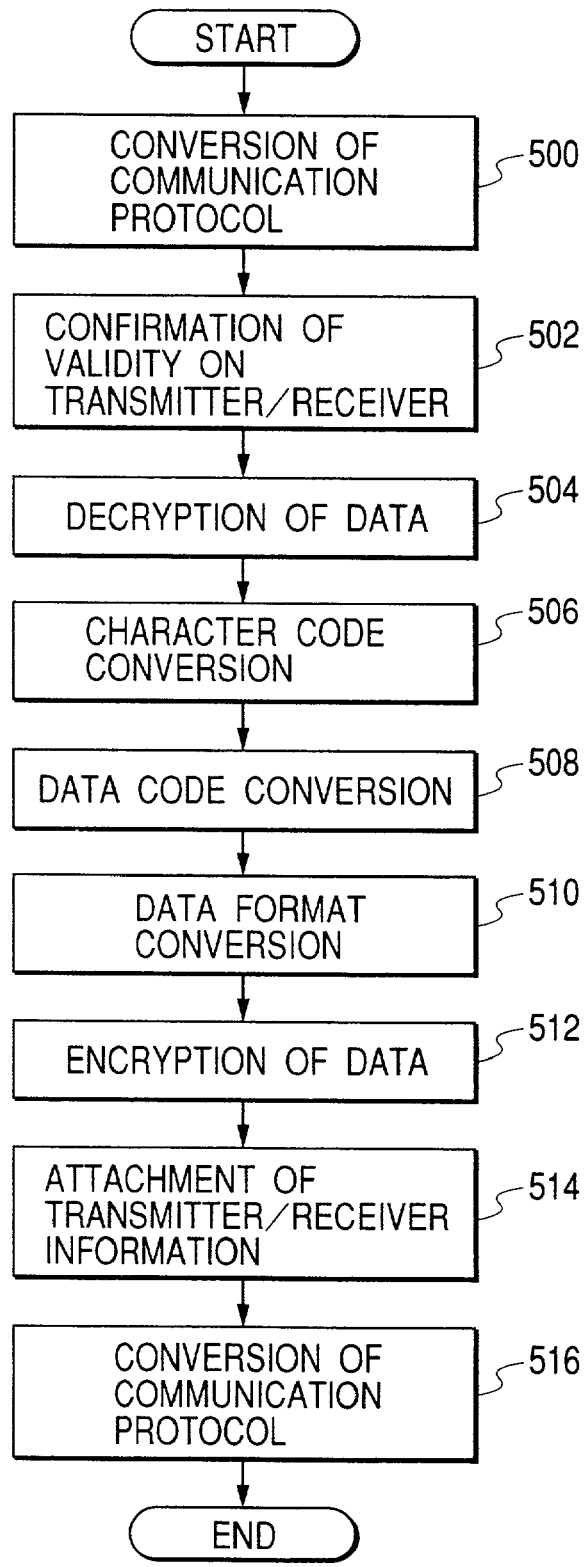

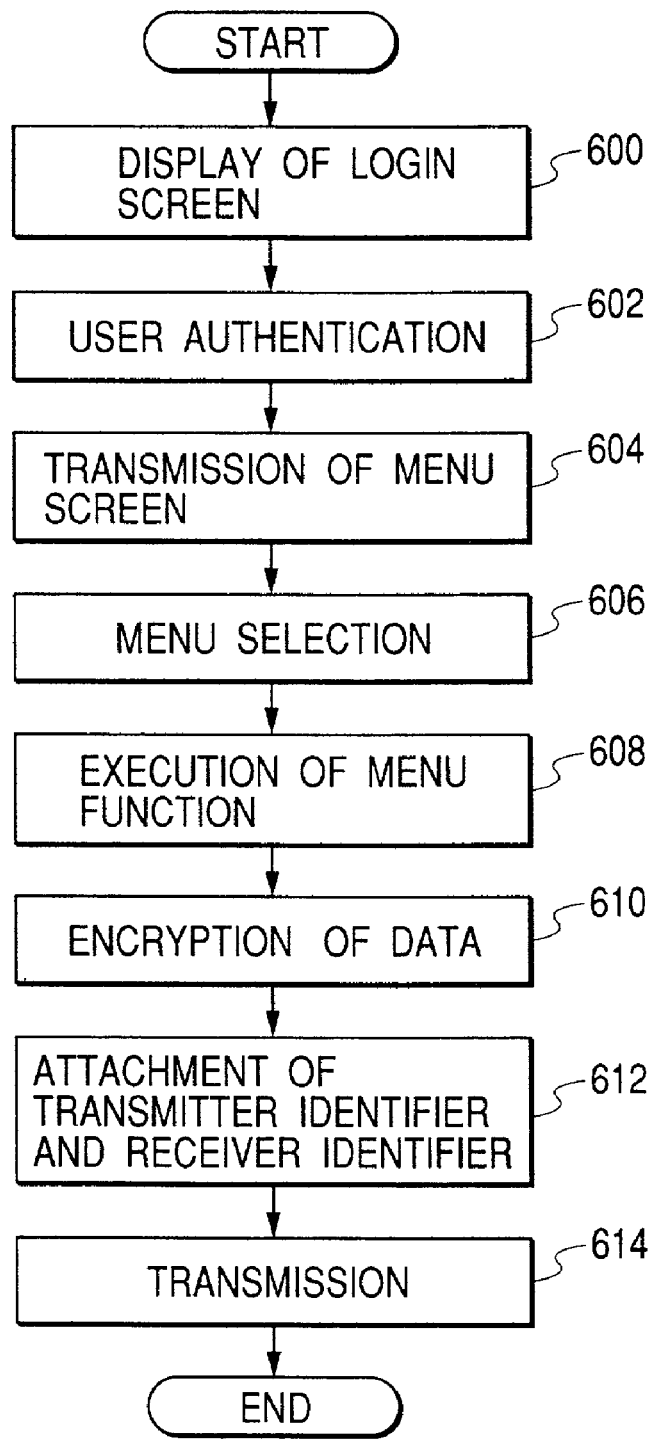

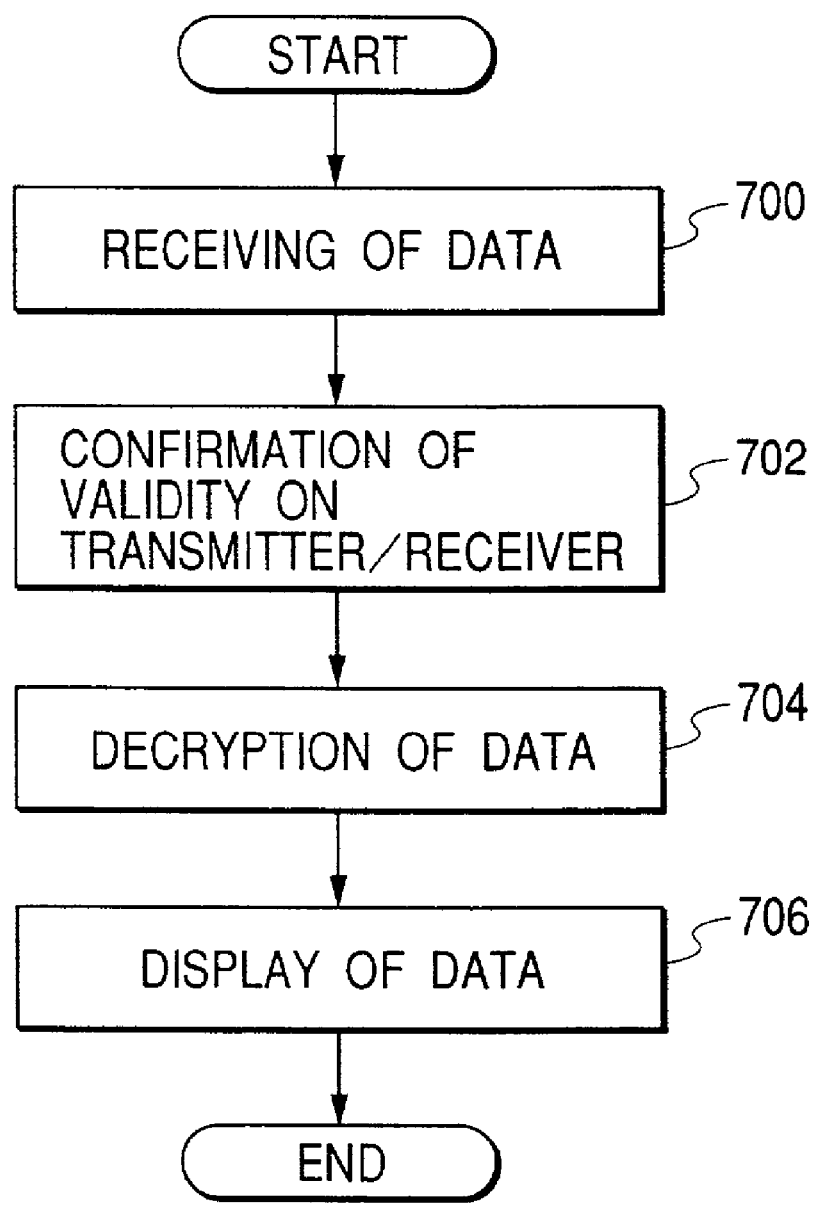

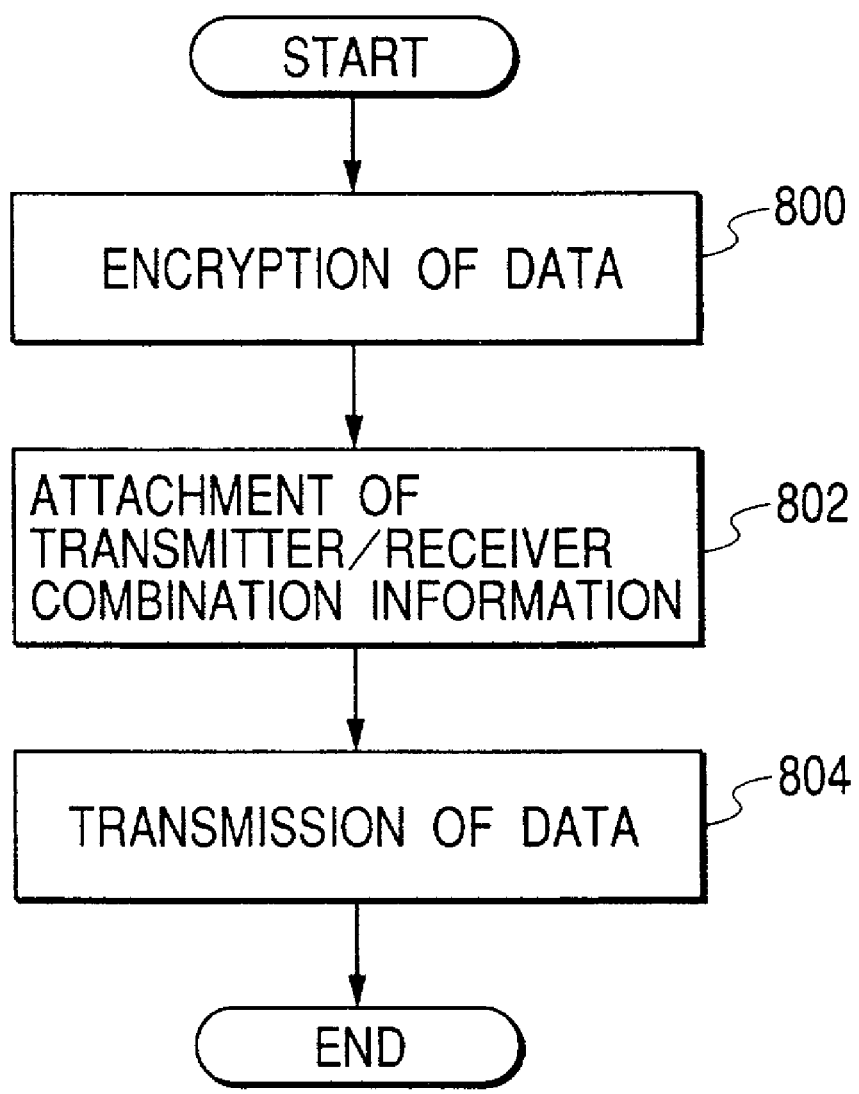

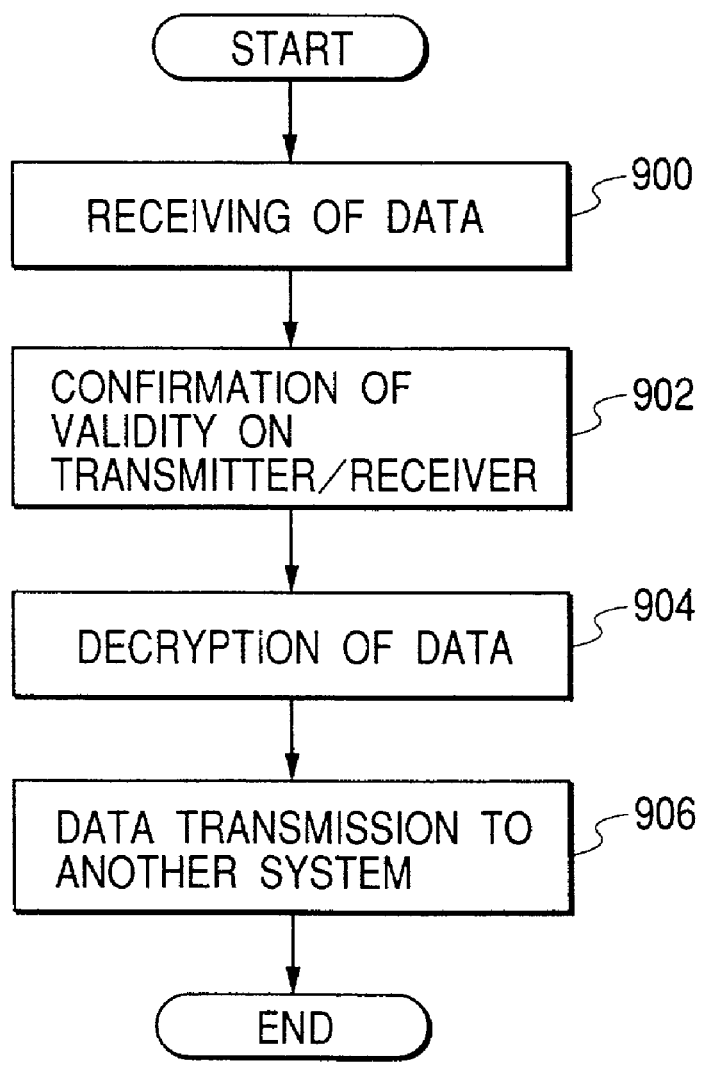

GATEWAY SYSTEM

BACKGROUND OF THE INVENTION

The present invention relates to a gateway system characterized in that said gateway system provides a communication protocol conversion function and a data format conversion function which are used at the time of connection to another system connected to an open network typified by Internet, and that said gateway system itself is also connected to the open network.

A method that is conventionally and usually used to settle differences of communication protocols, data formats, etc. between systems is the following: the data formats and the communication protocols are converted using various kinds of conversion programs. For example, communication over two networks can be realized by installing a machine, which executes a program for converting a protocol on the machine, in each of the networks to perform data communication between networks that adopt a different communication protocol each other.

However, the program and the system for realizing the communication are made by each company individually for its own use. In addition, hardware, on which the gateway system operates, is also prepared by each company on its own account. Therefore, initial investment for development and operation cost were required. Moreover, because of difference between communication protocols or between data formats, it is usually required to build a gateway system separately for each destination, resulting in an increase in a cost and in a burden on humans. Therefore, if a number of destinations is many, a huge cost is required to cover all of the destinations.

By the way, as a result of a recent Internet boom, Internet exchanges, at which commodities are dealt with on Internet, become widespread. In addition to it, as regards purchase behavior of an individual, dependency on Internet is also increased. Therefore, each company encounters a situation in which the company is forced to handle business transactions on Internet. Under the circumstance, an information system is required to be connected to an open network such as Internet. However, because the conventional information system is not developed on the assumption that the information system is connected to an open network, it is necessary to modify the system profoundly, or to update the system, in order to achieve the connection. This requires a great expense. However, because of a considerable change in recent management environment, it is not easy to subsidize the expense.

SUMMARY OF THE INVENTION

On the other hand, recently, as a company that leases business application software to a customer through an open network typified by Internet, an application service provider (hereinafter it is abbreviated as ASP) is gaining attention. In this case, a user uses a Web browser to utilize application software installed in a server possessed by ASP. If such an application is utilized, it is not necessary to install an individual application on a user's personal computer. Because of it, reduction of cost and time required for installation, management, and upgrade, which were a considerable burden on the information system department of the company, becomes possible.

In order to achieve the above-mentioned object, the present invention provides a user with the following gateway system in a form of the above-mentioned ASP: in a gateway system that performs data format conversion, etc. at the time of data transmission between two information systems, which are connected through a network, the gateway system can handle a portion, which should be customized for each user, only by changing various tables without changing a kernel portion. In addition, as regards an interface to the information system through the gateway, providing the user with the interface in the form of ASP enables a destination company, which does not have their own information system, to reduce expenditure on clerical work.

BRIEF DESCRIPTION OF THE DRAWINGS

FIG. 2 is a flowchart illustrating a process flow in a gateway site;

FIG. 3 is a flowchart illustrating a process flow of data transmission in an interface site;

FIG. 4 is a flowchart illustrating a process flow of data reception in an interface site;

FIG. 5 is a flowchart illustrating a process flow at the time of data transmission in a customer site; and FIG. 6 is a flowchart illustrating a process flow at the time of data reception in a customer site.

DETAILED DESCRIPTION OF THE PREFERRED EMBODIMENTS

Figure 1:
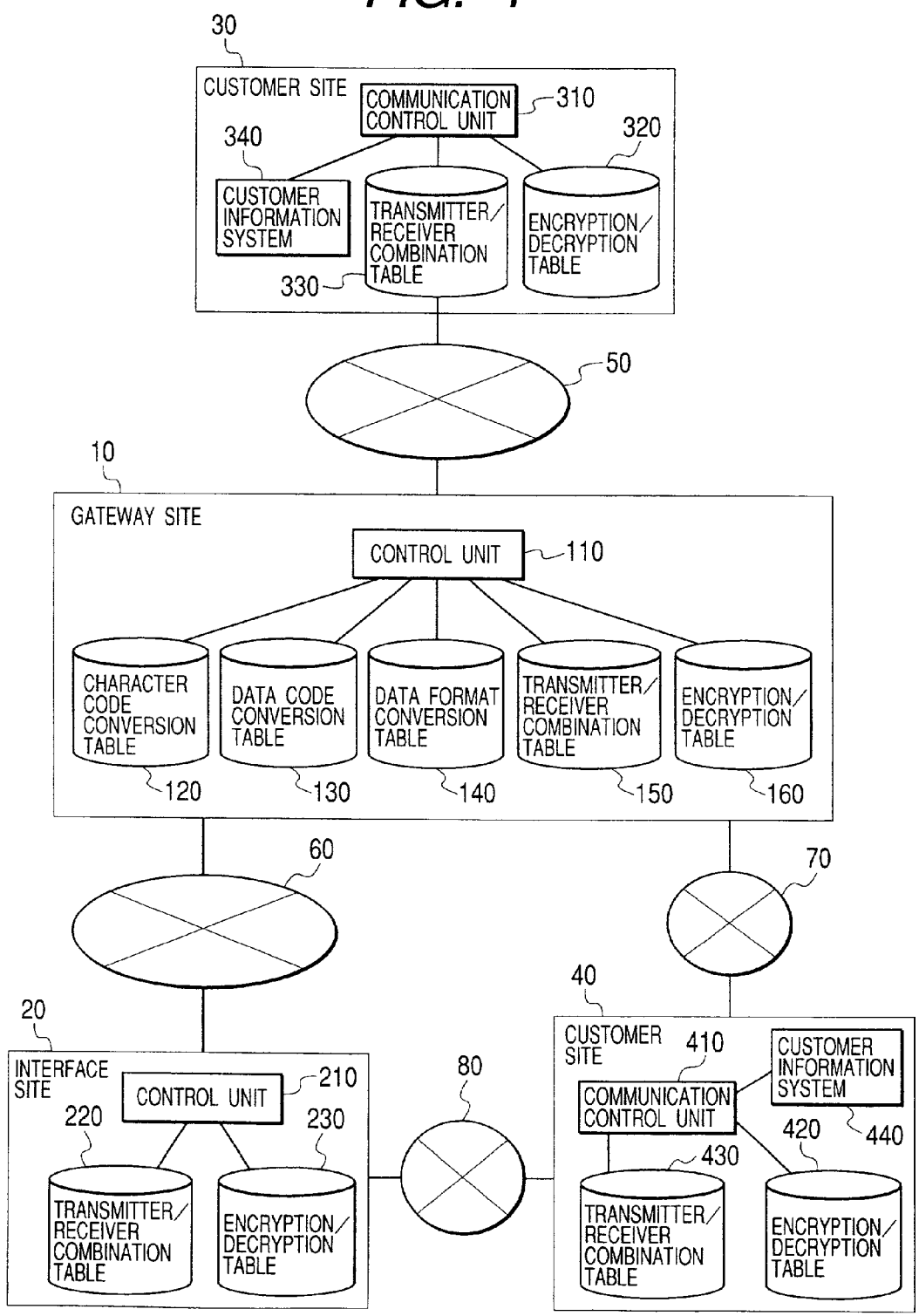
FIG. 1 is a configuration diagram illustrating a whole gateway system in an embodiment of the present invention.

Embodiments of the present invention will be described in detail with reference to drawings as below.

FIG. 1 illustrates a network system that constitutes the present invention. A gateway site 10 comprises the following: a control unit 110 for controlling a whole system; a character code conversion table 120 that holds information for converting two or more kinds of character codes; a data format conversion table 140 that holds information for converting data format; a data code conversion table 130 that holds information on differences of various data codes among systems; a transmitter/receiver combination table 150 having information on judgment as to whether combination of a transmitter and a receiver is appropriate; and an encryption/decryption table 160 having information on encryption of data to be transmitted and decryption of received data. The gateway site 10 is connected to a customer site 30 via a network 50. Examples of the network 50 include an open network typified by Internet, and various kinds of dedicated lines. In this case, information before conversion and after conversion, information on a decryption key corresponding to an encryption key, or the like, is preset in the character code conversion table 120, the data code conversion table 130, the data format conversion table 140, the transmitter/receiver combination table 150, and the encryption/decryption table 160, corresponding to combination of a transmitter identifier and a receiver identifier. The settings permit ASP of one-to-one communication gateway between the transmitter and the receiver to be realized.

The customer site 30 comprises the following: a communication control unit 310 for controlling communication with the gateway site 10; an encryption/decryption table 320 having information on encryption of data to be transmitted and decryption of received data; a transmitter/receiver combination table 330 having information on judgment as to whether or not combination of a transmitter and a receiver is appropriate; and a customer information system 340 that includes various kinds of systems required to carry out customer's business. Examples of the customer information system 340 include an ordering system, an inventory management system, and various kinds of reservation systems.

In addition, the gateway site 10 is connected to an interface site 20 having a user interface function that performs various kinds of data processing for a information system connected to the gateway system through a network 60. Examples of the network 60 include an open network typified by Internet, various kinds of dedicated lines, and a local area network.

The gateway site 10 is connected to a customer site 40, which is separate from the customer site 30, via a network 70 as necessary. Examples of the network 70 include an open network typified by Internet, and various kinds of dedicated lines. The customer site 40 comprises the following: a communication control unit 410 for controlling communication with the gateway site 10; an encryption/decryption table 420 having information on decryption of received data; a transmitter/receiver combination table 430 having information on judgment as to whether or not combination of a transmitter and a receiver is appropriate; and a customer information system 440 that includes various kinds of systems required to carry out customer's business. As an example of the customer information system 440, there is a system such as an ordering system and supply chain management system, which can operate in conjunction with the customer site 30.

On the other hand, the interface site 20 can be connected to the customer site 40 via the network 80. In this case, an open network typified by Internet, or various kinds of dedicated lines can be used as the network 80. The interface site 20 comprises the following: a control unit 210 for controlling an entire system; a transmitter/receiver combination table 220 having information on judgment as to whether or not combination of a transmitter and a receiver is appropriate; and an encryption/decryption table 230 having information on encryption of data to be transmitted. The interface site 20 provides a user interface for accessing the customer site 30 via the gateway site 10.

If the customer site 40 does not have an interface such as a graphical interface, which is used to access the customer site 30 via the gateway site 10, the control unit 210 in the interface site 20 performs interface processing as shown in FIG. 3. The interface site 20 plays a role as ASP that has an interface function.

FIG. 2 is a flowchart illustrating processing performed in the gateway site 10 at the time of communication between the customer site 30 and the customer site 40, or communication between the customer site 30 and the interface site 20. To simplify explanation, a case where data is transmitted from the customer site 30 to the customer site 40 will be described as an example. When the gateway site 10 receives the data from the customer site 30, a communication protocol is converted from a form peculiar to the customer site 30 to a form peculiar to the gateway site (step 500). The gateway site 10 collates information on transmitter/receiver combination, and checks whether or not combination of a transmitter identifier and a receiver identifier, which are added to the data, is valid (step 502). After the validity is confirmed, in the next place, the gateway site 10 decrypts the data with reference to the encryption/decryption table 160 (step 504). In addition, the gateway site 10 converts character codes with reference to the character code conversion table 120 (step 506). Then, the gateway site 10 converts data codes with reference to the data code conversion table 130 (step 508). After that, the gateway site 10 converts a data format with reference to the data format conversion table 140 (step 510). The gateway site 10 encrypts the data, of which data format has been converted, with reference to the encryption/decryption table 160 (step 512). The gateway site 10 adds the transmitter identifier and the receiver identifier to the encrypted data with reference to the information on transmitter/receiver combination 150 (step 514). Finally, the gateway site 10 converts the communication protocol into that adopted by the customer site 40, and transmits the data to the customer site 40 before the processing ends (step 516).

The above-mentioned processing can be achieved by a program in the gateway site. Moreover, such a program can be stored in a computer-readable storage medium such as CD-ROM.

FIG. 3 is a flowchart illustrating a process flow in which a user logs in the interface site 20 and data is transmitted. Once the user in the customer site 40 logs in, the login is accepted in the interface site 20 (step 600). The interface site 20 authenticates the user, who has logged in, with the use of the authentication database (step 602). When the user is authenticated, menu information is transmitted from the interface site 20 to the terminal of the user in the customer site 40 (step 604). The user selects a sub menu, which the user wants to use, from a displayed menu (step 606). When the interface site 20 receives information on a sub menu number, the interface site 20 performs processing of the selected menu (step 608). As a result of the menu processing, if data exchange with the customer site 30 or the gateway site 10 is required, the encryption/decryption table 220 is referred to before the transmission data is encrypted (step 610). Then, with reference to the transmitter/receiver combination table 220, a transmitter identifier and a receiver identifier are added to the data to be transmitted (step 612). Finally, the data is transmitted from the interface site 20 to the gateway site 10, and then the processing ends (step 614).

FIG. 4 is a flowchart illustrating a process flow in which the interface site 20 receives data from the gateway site 10 and displays the data for a user. When data is transmitted from the gateway site 10, the data is received (step 700). With reference to the transmitter/receiver combination table 20, whether or not combination of a transmitter and a receiver is valid is checked (step 702). If a result of the verification is appropriate, the encryption/decryption table 230 is referred to, and then the data is decrypted (step 704). Finally, the decrypted data is displayed in the terminal of the user who is accessing the interface site (step 706).

FIG. 5 is a flowchart illustrating a process flow of data transmission in the customer site 30 (the process flow is the same as that of the customer site 40). When data to be transmitted from a system in the customer site 30 to a system in the customer site 40 is generated, the encryption/decryption table 320 in the customer site 30 is referred to before the data is encrypted (step 800). Then, with reference to the transmitter/receiver combination table 330, a transmitter identifier and a receiver identifier are added (step 802). Finally, the data is transmitted to the gateway site 10 (step 804).

FIG. 6 is a flowchart illustrating a process flow of data reception in the customer site 30 (the process flow is the same as that of the customer site 40). When the customer site 30 receives data that has been transmitted from the gateway site 10 (step 900), the customer site 30 refers to the transmitter/receiver combination table 330, and check whether or not combination of a transmitter identifier and a receiver identifier, which have been added to the transmitted data, is valid (step 902). If a result of the verification is appropriate, the encryption/decryption table 320 is referred to, and then the data is decrypted (step 904). Finally, the decrypted data is transmitted to the customer information system 340, which requires the data and then the processing ends (step 906).

The processing illustrated by the flowchart in the drawing described above can be realized by programs in the interface site 20, the customer site 30 and the customer site 40. Moreover, such a program can be stored in a computer-readable storage medium such as CD-ROM.

According to the present invention, it is possible to realize cooperation between an own organization's information system and an external information system without bearing a heavy burden of system development and operation. Moreover, it is also possible to handle business transactions easily through an open network such as Internet.

What is claimed is:

1. A gateway system that converts data formats and data codes at the time of communication between systems, each of which has a different data format and a different data code, the gateway system being connected to an open network, said gateway system comprises:
   a character code conversion information storing means that has character code to character code conversion information;
   a data code information storing means for storing information on various kinds of data code systems;
   a data format conversion information storing means for storing information used for data format conversion related to a data format and a data length;
   a data encryption and decryption table, which is used for encrypting data to be transmitted and for decrypting received data;
   a transmitter and receiver combination information storing means for judging whether or not a combination of a transmitter and a receiver of data is valid;
   a means for receiving data from a first information system, the data having a transmitter identifier and a receiver identifier attached thereto;
   a means for checking whether or not a combination of the transmitter identifier and the receiver identifier is valid based on the transmitter and receiver combination information for data exchange between the first information system and a second information system, which are connected to the same network as that of the gateway system;
   a means for performing a data encryption and decryption function;
   a means for performing data format conversion, data code conversion, and character code conversion, from the data of the first information system to converted data of the second information system; and
   a means for transmitting the converted data to the second information system.

2. A gateway system according to claim 1, further comprising:
   a user interface means, which is connected to the gateway via a network, for performing various kinds of data processing for an information system, which is connected to the gateway system, through the gateway system.

3. A gateway system according to claim 2, wherein:
   said user interface is a graphical user interface.

4. A computer readable medium that stores a program for providing a function of a user interface, which is connected to said gateway system according to claim 1 via a network, for performing various kinds of data processing for an information system, which is connected to the gateway system, through the gateway system.

5. A computer readable medium that stores said program according to claim 4, wherein:
   said user interface is a graphical user interface.

6. A computer readable medium for realizing a gateway system, the gateway system being connected to an open network, wherein:
   said gateway system comprises:
   a character code conversion information storing means that has information used for character code to character code conversion;
   a data code conversion information storing means having information used for converting various kinds of data code systems;
   a data encryption and decryption table, which is used for encrypting data to be transmitted and for decrypting received data;
   a data format conversion information storing means for storing information used for data format conversion related to a data format and a data length; and
   a transmitter and receiver combination information storing means for storing transmitter receiver combination information used for judging whether or not a combination of a transmitter and a receiver of data is valid;
   wherein functions realized by executing a program stored on the medium comprise:
   a function of receiving data from a first information system, the data having a transmitter identifier and a receiver identifier attached thereto;
   a function of checking whether or not a combination of the transmitter identifier and the receiver identifier is valid based on the transmitter and receiver combination information for data exchange between the first information system and a second information system, which are connected to the same network as that of the gateway system; a function of performing a data encryption and decryption based on said data encryption and decryption table;
   a function of performing data format conversion, data code conversion, and character code conversion, from the data of the first information system to converted data of the second information system; and
   a function of transmitting the converted data to the second information system.

7. A computer readable medium that stores a program for realizing a gateway system, the gateway system being connected to an open network, wherein:
   said gateway system comprises:
   a character code conversion information storing means that stores information used for character code to character code conversion;
   a data code conversion information storing means that stores information used for converting various kinds of data code systems;
   a data encryption and decryption table, which is used for encrypting data to be transmitted and for decrypting received data;
   a data format conversion information storing means for storing information used for data format conversion related to a data format and a data length; and
   a transmitter and receiver combination information storing means that stores information used for judging whether or not combination of a transmitter and a receiver of data is valid;
   wherein functions realized by executing the program comprise:

a function of receiving data from a first information system, the data having a transmitter identifier and a receiver identifier attached thereto;

a function of checking whether or not a combination of the transmitter identifier and the receiver identifier is valid based on the transmitter and receiver combination information for data exchange between the first information system and a second information system, which are connected to the same network as that of the gateway system;

a function of performing a data encryption and decryption based on said data encryption and decryption table;

a function of performing data format conversion, data code conversion, and character code conversion, from the data of the first information system to converted data of the second information system; and a function of transmitting the converted data to the second information system.

* * * * *